US011018530B2

(12) United States Patent
Narayana Bhat et al.

(10) Patent No.: US 11,018,530 B2
(45) Date of Patent: May 25, 2021

(54) WIRELESS POWER TRANSMISSION APPARATUS WITH MULTIPLE CONTROLLERS

(71) Applicant: GE Hybrid Technologies, LLC, Niskayuna, NY (US)

(72) Inventors: Suma Memana Narayana Bhat, Bangalore (IN); Viswanathan Kanakasabai, Bangalore (IN); Deepak Aravind, Bangalore (IN); Adnan Kutubuddin Bohori, Bangalore (IN)

(73) Assignee: GE Hybrid Technologies, LLC, Niskayuna, NY (US)

( * ) Notice: Subject to any disclaimer, the term of this patent is extended or adjusted under 35 U.S.C. 154(b) by 140 days.

(21) Appl. No.: 16/184,501

(22) Filed: Nov. 8, 2018

(65) Prior Publication Data

US 2020/0076242 A1 Mar. 5, 2020

(30) Foreign Application Priority Data

Aug. 31, 2018 (IN) .............................. 201841032694

(51) Int. Cl.
*H02J 50/40* (2016.01)
*H02J 50/12* (2016.01)
(Continued)

(52) U.S. Cl.
CPC .............. *H02J 50/40* (2016.02); *H02J 7/025* (2013.01); *H02J 50/12* (2016.02); *H02J 50/90* (2016.02); *B60L 53/12* (2019.02)

(58) Field of Classification Search
None
See application file for complete search history.

(56) References Cited

U.S. PATENT DOCUMENTS 5,995,900 A 11/1999 Hsiao et al.
8,629,654 B2 1/2014 Partovi et al.
(Continued)

FOREIGN PATENT DOCUMENTS

CN 205960748 2/2017
JP 2013098846 9/2013
(Continued)

OTHER PUBLICATIONS

"PCT International Application PCT/US19/48761 International Seatch Report and Written Opinion", dated Nov. 20, 2019, 11 pages.
(Continued)

*Primary Examiner* — Jared Fureman
*Assistant Examiner* — Aqeel H Bukhari
(74) *Attorney, Agent, or Firm* — DeLizio Law, PLLC

(57) ABSTRACT

This disclosure provides systems, devices, apparatus and methods, including computer programs encoded on storage media, for wireless power transmission. In accordance with this disclosure, a wireless power transmission apparatus (such as a charging pad) may support positional freedom such that a wireless power receiving apparatus may be charged regardless of positioning or orientation of the wireless power receiving apparatus. Various implementations include the use of multiple primary coils in a wireless power transmission apparatus. In some implementations, a wireless power transmission apparatus having multiple local controllers to activate different primary coils. In some implementations, the wireless power transmission apparatus may support concurrent charging of multiple wireless power receiving apparatuses. Furthermore, in some implementations, the wireless power transmission apparatus may support charging of a wireless power receiving apparatus that moves in relation to the wireless power transmission apparatus.

29 Claims, 8 Drawing Sheets

(51) Int. Cl.
  *H02J 7/02* (2016.01)
  *H02J 50/90* (2016.01)
  *B60L 53/12* (2019.01)

(56) References Cited

U.S. PATENT DOCUMENTS

| | | | |
|---|---|---|---|
| 8,916,994 | B2 | 12/2014 | Jung et al. |
| 9,112,363 | B2 | 8/2015 | Partovi |
| 9,129,741 | B2 | 9/2015 | Tseng |
| 9,130,394 | B2 | 9/2015 | Burdo et al. |
| 9,252,628 | B2 | 2/2016 | Leabman et al. |
| 9,360,456 | B2 | 6/2016 | Miyamoto |
| 9,409,490 | B2 | 8/2016 | Kawashima |
| 9,796,280 | B2 | 10/2017 | McCool et al. |
| 9,893,553 | B2 | 2/2018 | Pudipeddi et al. |
| 10,097,038 | B2 | 10/2018 | Leem |
| 10,115,520 | B2 | 10/2018 | Partovi |
| 2013/0015705 | A1* | 1/2013 | Abe .................. H02J 50/50 307/29 |
| 2014/0021798 | A1 | 1/2014 | Kesler et al. |
| 2014/0103730 | A1* | 4/2014 | Irie .................. H02J 7/00045 307/104 |
| 2014/0191568 | A1 | 7/2014 | Partovi |
| 2015/0051750 | A1 | 2/2015 | Kurs et al. |
| 2015/0214775 | A1 | 7/2015 | Lee et al. |
| 2015/0371771 | A1 | 12/2015 | Abu Qahouq |
| 2016/0094043 | A1 | 3/2016 | Hao et al. |
| 2016/0308394 | A1 | 10/2016 | Abdolkhani et al. |
| 2016/0336817 | A1 | 11/2016 | Jabori et al. |
| 2017/0133876 | A1 | 5/2017 | Knepper |
| 2017/0317536 | A1 | 11/2017 | Marson et al. |
| 2017/0326992 | A1* | 11/2017 | Budhia .................. H01F 27/40 |
| 2017/0338684 | A1 | 11/2017 | Mishriki et al. |
| 2018/0013310 | A1 | 1/2018 | Moussaoui et al. |
| 2018/0019624 | A1 | 1/2018 | Chen |
| 2018/0034327 | A1 | 2/2018 | Ren et al. |
| 2018/0052649 | A1 | 2/2018 | Patel |
| 2018/0062416 | A1 | 3/2018 | Terry et al. |
| 2018/0062442 | A1 | 3/2018 | Qiu et al. |
| 2018/0090954 | A1 | 3/2018 | Graham et al. |
| 2018/0090955 | A1 | 3/2018 | Graham et al. |
| 2018/0090999 | A1 | 3/2018 | Graham et al. |
| 2018/0091000 | A1 | 3/2018 | Jol et al. |
| 2018/0175671 | A1 | 6/2018 | Ren |
| 2018/0301933 | A1 | 10/2018 | Lee et al. |
| 2018/0301936 | A1 | 10/2018 | Lee et al. |
| 2018/0351414 | A1 | 12/2018 | Park |

FOREIGN PATENT DOCUMENTS

| | | |
|---|---|---|
| KR | 101765940 | 8/2017 |
| WO | 2014082571 | 6/2014 |
| WO | 2017176128 | 10/2017 |
| WO | 2018057656 | 3/2018 |

OTHER PUBLICATIONS

Kim, et al., "Wireless Power Transfer for Free Positioning Using Compact Planar Multiple Self-Resonators", https://ieeexplore.ieee.org/document/6215789, May 2012, 4 pages.

Waffenschmidt, "Wireless Power for Mobile Devices", 2011 IEEE 33rd International Telecommunications Energy Conference (INTELEC), Oct. 9-13, 2011, pp. 1-9.

Zhong, et al., "Analysis on a Single-Layer Winding Array Structure for Contactless Battery Charging Systems With Free-Positioning and Localized Charging Features", IEEE Energy Conversion Congress and Exposition, Sep. 12-16, 2010, 658-665.

"Qi System Description Wireless Power Transfer", Wireless Power Consortium, vol. 1:Low Power, Part 1:Interface Definition, Version 1.0.1, Oct. 2010, 88 pages.

"The Qi Wireless Power Introduction to the Power Class 0 Specification", Qi Wireless Power Consortium, Version 1.2.3, Feb. 2017, 16 pages.

"The Qi Wireless Power Transfer Power Class 0 Specification", Qi Wireless Power Consortium, Parts 1 and 2: Interface Definitions, Version 1.2.2, Apr. 2016, 160 pages.

"The Qi Wireless Power Transfer Power Class 0 Specification", Qi Wireless Power Consortium, Part 4: Reference Designs, Version 1.2.2, Apr. 2016, 309 pages.

"The Qi Wireless Power Transfer System Power Class 0 Specification", Qi Wireless Power Consortium, Parts 1 and 2: Interface Definitions, Version 1.2.3, Feb. 2017, 165 pages.

"The Qi Wireless Power Transfer System Power Class 0 Specification", Qi Wireless Power Consortium, Part 4: Reference Designs, Version 1.2.3, Feb. 2017, 337 pages.

"PCT Application No. PCT/US2019/048761 International Preliminary Report on Patentability", dated Mar. 11, 2021, 10 pages.

* cited by examiner

WIRELESS POWER TRANSMISSION APPARATUS WITH MULTIPLE CONTROLLERS

RELATED APPLICATIONS

This patent application claims the priority benefit of India Patent Application No. 201841032694, filed Aug. 31, 2018, entitled "WIRELESS POWER TRANSMISSION APPARATUS WITH MULTIPLE CONTROLLERS," and assigned to the assignee hereof. The disclosure of the prior application is considered part of and are incorporated by reference in this patent application.

TECHNICAL FIELD

This disclosure relates generally to wireless power, and more specifically, to a wireless power transmission apparatus.

DESCRIPTION OF THE RELATED TECHNOLOGY

Conventional wireless power systems have been developed with a primary objective of charging a battery in a wireless power receiving apparatus, such as a mobile device, a small electronic device, gadget, or the like. In a conventional wireless power system, a wireless power transmission apparatus may include a primary coil that produces an electromagnetic field which induces a voltage in a secondary coil placed in proximity to the primary coil. In this configuration, the electromagnetic field may transfer power to the secondary coil wirelessly. The wireless power receiving apparatus may store the received energy in a battery for subsequent use. The power transfer capability may be related to how closely the primary coil and secondary coil are positioned to each other. Therefore, in some traditional wireless power systems, the structure of the wireless power transmission apparatus may be designed to limit positioning of the wireless power receiving apparatus and impose an expected alignment between the primary coil and secondary coil.

SUMMARY

The systems, methods and apparatuses of this disclosure each have several innovative aspects, no single one of which is solely responsible for the desirable attributes disclosed herein.

One innovative aspect of the subject matter described in this disclosure can be implemented in a wireless power transmission apparatus. In some implementations, the wireless power transmission apparatus may include a plurality of primary coils that are independently capable of transmitting wireless power. The wireless power transmission apparatus may include a plurality of local controllers configured to manage the plurality of primary coils, the plurality of local controllers including at least a first local controller and a second local controller. The first local controller may be configured to cause at least a first primary coil of the plurality of primary coils to transmit wireless power in response to a determination that a first wireless power receiving apparatus is in proximity to the first primary coil.

Another innovative aspect of the subject matter described in this disclosure can be implemented in a method for wireless power transmission. In some implementations, the method may include managing a plurality of primary coils in a wireless power transmission apparatus. The plurality of primary coils may be independently capable of transmitting wireless power. The plurality of primary coils may be managed by a plurality of local controllers. In some implementations, the method may include determining that a first wireless power receiving apparatus is in proximity to a first primary coil of the plurality of primary coils. In some implementations, the method may include causing, by a first local controller of the plurality of local controllers, the first primary coil to transmit wireless power in response to a determination that the first wireless power receiving apparatus in proximity to the first primary coil.

Another innovative aspect of the subject matter described in this disclosure can be implemented in a computer-readable storage medium that includes instructions stored therein which, when executed by a processor of a wireless power transmission apparatus, cause the wireless power transmission apparatus to perform the above method.

In some implementations, the wireless power transmission apparatus, method, or computer-readable storage medium may include a charging pad on which multiple wireless power receiving apparatuses may be placed. The plurality of primary coils may be arranged in an overlapping pattern that is distributed among multiple layers of the charging pad.

In some implementations, when energized, the plurality of primary coils may be arranged to create a magnetic field without any dead zones in a charging surface of the wireless power transmission apparatus. In some implementations, when all the primary coils are energized, all of the zones of charging surface may have an electromagnetic field for charging.

In some implementations, the first wireless power receiving apparatus may be a movable device. In some implementations, the wireless power transmission apparatus may include a surface for transmitting power to the movable device while the movable device is in motion.

In some implementations, the wireless power transmission apparatus, method, or computer-readable storage medium may include the second local controller being configured to cause at least a second primary coil of the plurality of primary coils to transmit wireless power in response to a determination that a second wireless power receiving apparatus is in proximity to the second primary coil.

In some implementations, the wireless power transmission apparatus, method, or computer-readable storage medium may include the first primary coil and the second primary coil being configured to concurrently transmit wireless power to the first wireless power receiving apparatus and the second wireless power receiving apparatus, respectively.

In some implementations, the wireless power transmission apparatus, method, or computer-readable storage medium may include the first local controller being configured to manage a first voltage of the wireless power transmitted by the first primary coil to the first wireless power receiving apparatus, and the second local controller being configured to manage a second voltage of the wireless power transmitted by the second primary coil to the second wireless power receiving apparatus. In some implementations, the first voltage and the second voltage may be different.

In some implementations, the wireless power transmission apparatus, method, or computer-readable storage medium may include at least a first local sensor configured to detect an object in proximity to the first primary coil based on a coil current measurement. In some implementations, the first local controller may be configured to determine that the object is the first wireless power receiving apparatus based on load variations in a series of coil current measurements.

In some implementations, the wireless power transmission apparatus, method, or computer-readable storage medium may include the first local controller being configured to determine that the object is the first wireless power receiving apparatus based, at least in part, on decoding load modulated data associated with the load variations.

In some implementations, the wireless power transmission apparatus, method, or computer-readable storage medium may include the first local controller being configured to determine a configuration of the first wireless power receiving apparatus based, at least in part, on the decoded load modulated data.

In some implementations, the wireless power transmission apparatus, method, or computer-readable storage medium may include a plurality of local sensors configured to detect load variations associated with corresponding ones of the plurality of primary coils.

In some implementations, each local controller may be associated with a corresponding local sensor and corresponding primary coil. In some implementations, each local controller is configured to manage one or more primary coils in response to the load variations detected by the corresponding local sensor.

In some implementations, the wireless power transmission apparatus, method, or computer-readable storage medium may include one or more communication units configured to communicate with the first wireless power receiving apparatus via one or more primary coils. The first wireless power receiving apparatus may be determined to be in proximity to the first primary coil may be based, at least in part, on a first communication received from the first wireless power receiving apparatus via the first primary coil.

In some implementations, the first wireless power receiving apparatus may be embodied as a vehicle for transporting people or goods.

In some implementations, the wireless power transmission apparatus may be embodied in a floor or road surface.

In some implementations, the plurality of local controllers may cause different primary coils to transmit wireless power based, at least in part, on an alignment between a secondary coil of the first wireless power receiving apparatus and the different primary coils as the first wireless power receiving apparatus moves over the floor or road surface.

In some implementations, the wireless power transmission apparatus, method, or computer-readable storage medium may include a supervisory controller configured to coordinate operations of the plurality of local controllers.

In some implementations, the wireless power transmission apparatus, method, or computer-readable storage medium may include the supervisory controller being configured to coordinate a detection phase of the receiver performed by the plurality of local controllers to cause neighboring local controllers to perform the detection phase at deterministic times.

In some implementations, the wireless power transmission apparatus, method, or computer-readable storage medium may include the supervisory controller being configured to coordinate the wireless charging of the plurality of local controllers based, at least in part, on a position of the first wireless power receiving apparatus in relation to the plurality of primary coils.

In some implementations, the wireless power transmission apparatus, method, or computer-readable storage medium may include the supervisory controller being configured to determine the position based, at least in part, on an indication from the first local controller that the first wireless power receiving apparatus in proximity to the first primary coil.

In some implementations, the wireless power transmission apparatus, method, or computer-readable storage medium may include the first local controller being configured to determine the position of the first wireless power receiving apparatus in relation to multiple primary coils of the plurality of primary coils.

In some implementations, the wireless power transmission apparatus, method, or computer-readable storage medium may include the supervisory controller being communicatively coupled with at least a first spatial sensor that is configured to detect the position of the first wireless power receiving apparatus in relation to multiple primary coils of the plurality of primary coils. In some implementations, the first spatial sensor may include at least one of a camera, a light sensor, an auditory sensor, an infrared sensor, or a radio frequency energy sensor.

In some implementations, the wireless power transmission apparatus, method, or computer-readable storage medium may include the supervisory controller being configured to determine a second primary coil that is adjacent to the first primary coil, determine that the second local controller is associated with the second primary coil, and cause the second local controller to change to a ready state so that the second primary coil is ready to transmit wireless power in response to a motion of the first wireless power receiving apparatus in a first direction from the first primary coil to the second primary coil.

In some implementations, the wireless power transmission apparatus, method, or computer-readable storage media may include the supervisory controller being configured to communicate with the second local controller to cause the second primary coil to transmit wireless power in response to the motion of the first wireless power receiving apparatus.

In some implementations, the wireless power transmission apparatus, method, or computer-readable storage media may include the supervisory controller being configured to communicate with the first local controller to cause the first primary coil to stop transmitting wireless power to the first wireless power receiving apparatus in response to the motion of the first wireless power receiving apparatus. In some implementations, the first local controller may change to a ready state.

In some implementations, the supervisory controller may communicate with a third local controller associated with a third primary coil in proximity to the first primary coil to cause the third local controller to change from a ready state to an detection phase state.

In some implementations, the wireless power transmission apparatus, method, or computer-readable storage medium may include the supervisory controller being configured to predict the motion of the first wireless power receiving apparatus in the first direction based on a change in the position of the first wireless power receiving apparatus in relation to the plurality of primary coils.

In some implementations, the wireless power transmission apparatus, method, or computer-readable storage medium may include the supervisory controller being communicatively coupled with a server that controls the first wireless power receiving apparatus. In some implementations, the wireless power transmission apparatus, method, or computer-readable storage medium may include the supervisory controller being configured to predict the motion of the first wireless power receiving apparatus based on control information obtained from the server.

Another innovative aspect of the subject matter described in this disclosure can be implemented in an integrated circuit for use in a wireless power transmission apparatus housing a plurality of primary coils managed by corresponding integrated circuits. The integrated circuit may include electrical components for driving a wireless power signal to at least a first primary coil of a plurality of primary coils in the wireless power transmission apparatus. The integrated circuit may include electrical components implementing a local controller for managing at least one of a voltage level, a power level, or a frequency of the wireless power signal. The integrated circuit may electrical components implementing a communication unit for communicating with a wireless power receiving apparatus via the first primary coil.

In some implementations, the integrated circuit may include electrical components implementing a local sensor for measuring load variations based on a coil current measurement at the first primary coil. The integrated circuit may include electrical components for determining a first wireless power receiving apparatus is in proximity to the first primary coil based on the load variations. The integrated circuit may include electrical components for generating at least part of a wireless power signal and outputting the wireless power signal to the first primary coil in response determining that the first wireless power receiving apparatus is in proximity to the first primary coil.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
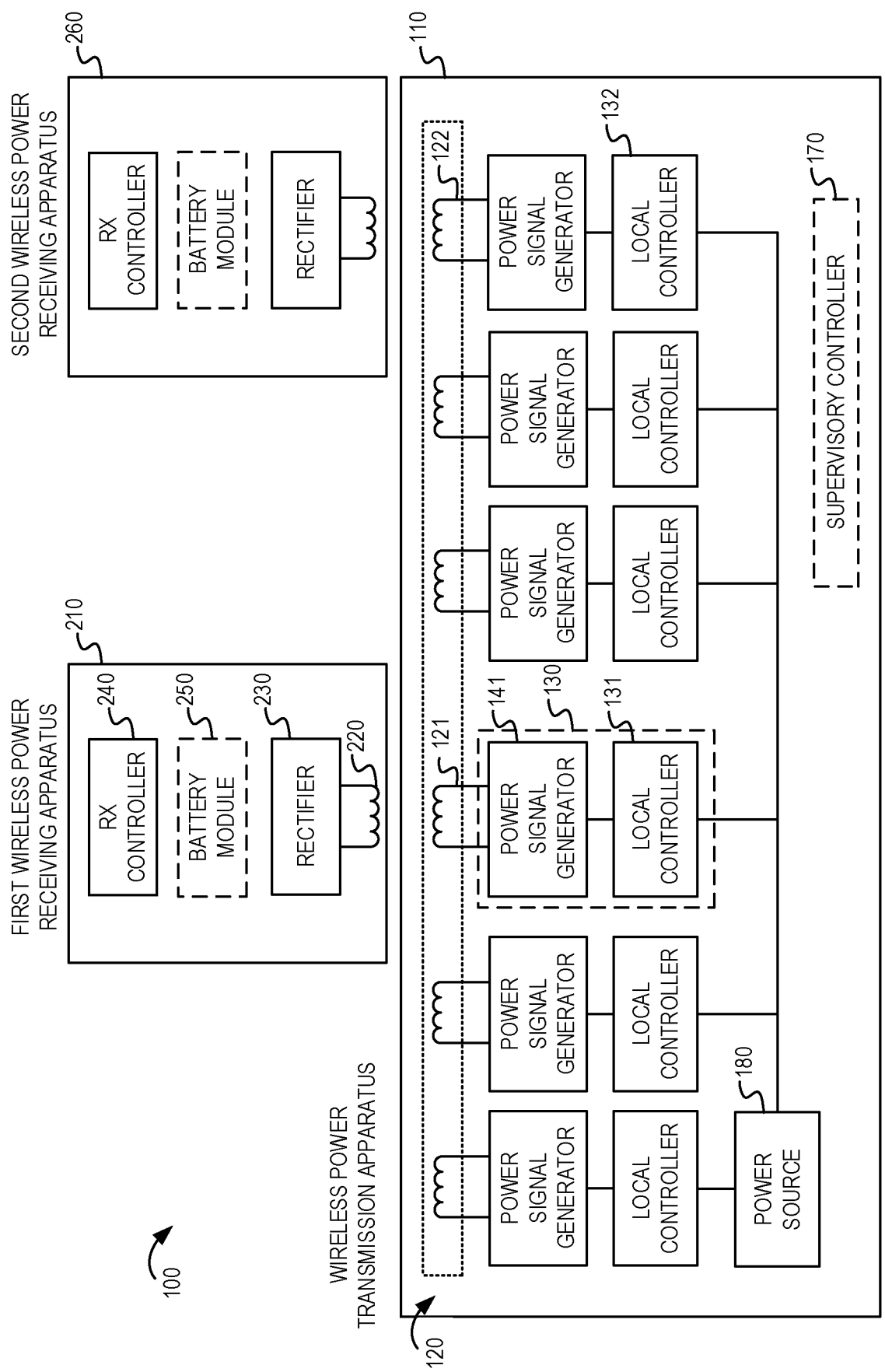
FIG. 1 shows an example wireless power system that includes a wireless power transmission apparatus capable of charging multiple wireless power receiving apparatuses according to some implementations.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system or method for transmitting or receiving wireless power.

As described above, some conventional wireless power systems may impose and rely on a particular positioning of a wireless power receiving apparatus in relation to the wireless power transmission apparatus. A wireless power transmission apparatus may include a controller that enables or disables the transmission of wireless energy based on how closely the wireless power receiving apparatus is positioned in relation to the wireless power transmission apparatus. For example, the transmission of wireless energy may depend on the degree of alignment between transmitting and receiving coils. In this disclosure, alignment may refer to a spatial relationship between a secondary coil of the wireless power receiving apparatus and a primary coil of the wireless power transmission apparatus. A primary coil refers to a source of wireless energy (such as inductive or magnetic resonant energy) in a wireless power transmission apparatus. A secondary coil is located in a wireless power receiving apparatus and receives the wireless energy. Wireless power transmission is more efficient when the primary and secondary coils are closely positioned. Conversely, the efficiency may decrease (or the power transfer may cease) when the primary and secondary coils are misaligned. In an effort to address misalignment concerns, some wireless power transmission apparatuses may couple multiple primary coils to the controller. For example, a controller may select a primary coil among multiple primary coils that is in proximity to the wireless power receiving apparatus. However, there may be a delay involved in scanning for the primary coil in proximity to the wireless power receiving apparatus. Furthermore, the circuitry involved in scanning and selecting for the primary coil may make the system complex. The controller may cause multiple primary coils to concurrently output wireless energy, which may result in undesirable electromagnetic interference (EMI). Furthermore, the wireless power transmission apparatus may be unable to adjust to different positioning and orientation of a wireless power receiving apparatus. The conventional wireless power transmission apparatus may be limited to charging a single wireless power receiving apparatus having a predetermined or fixed position in relation to the wireless power transmission apparatus.

In accordance with this disclosure, a wireless power transmission apparatus may support positional freedom such that a wireless power receiving apparatus may be charged regardless of positioning or orientation of the wireless power receiving apparatus. Various implementations relate generally to the use of multiple primary coils in a wireless power transmission apparatus. Some implementations more specifically relate to a wireless power transmission apparatus (such as a charging pad) having multiple local controllers to activate different primary coils. For example, the primary coils may be independently activated or deactivated based on whether it is aligned with a wireless power receiving apparatus. In some implementations, the wireless power transmission apparatus may support concurrent charging of multiple wireless power receiving apparatuses using different primary coils. Furthermore, in some implementations, the wireless power transmission apparatus may support charging of a wireless power receiving apparatus that moves in relation to the primary coils.

In some implementations, the wireless power transmission apparatus may have a plurality of primary coils that are independently capable of transmitting wireless power. The wireless power transmission apparatus may have separate circuitry for each primary coil such that each primary coil can be energized independently. For example, each primary coil may be associated with a different local controller, driver, voltage regulator, and the like. In some implementations, each primary coil may be coupled with separate circuit components like a capacitor (in series with the primary coil), a current sensing resistor, or other elements. Each local controller may determine whether to cause its associated primary coil to transmit wireless power. For example, the local controller may periodically activate one more switches associated with the primary coil (and series capacitor) to excite (or briefly energize) the primary coil. The local controller may perform a coil current sensing process to determine if a wireless power receiving apparatus is located near the primary coil. If a wireless power receiving apparatus is detected, the local controller may activate one or more switches associated with the primary coil to cause the primary coil to transmit wireless power. In some implementations, a local controller may independently manage more than one primary coil.

In some implementations, the electronics associated with controlling, energizing a primary coil, managing communication, and coil current sensing may be packaged into an integrated circuit (IC). For example, there may be one IC for every primary coil. Alternatively, a single IC may package multiple local controllers that are associated with separate primary coil connections. The use of an IC may decrease space and complexity associated with implementing multiple primary coils in a wireless power transmission apparatus. Furthermore, the IC may reduce interference, stray inductance, resistance, or other circuit parasitic effects that may otherwise be present when multiple electrical components and primary coils are used in a wireless power transmission apparatus.

This disclosure provides a design in which a charging surface may have an array of primary coils in a layered arrangement to reduce or eliminate dead zones. The design may reduce or eliminate zones with a magnetic field not strong enough to transfer power to the wireless power receiving apparatus in the charging surface. In some implementations, the wireless power transmission apparatus may be referred to as a zoneless charging pad. In some implementations, the wireless power transmission apparatus is capable of providing wireless power to a wireless power receiving apparatus that is in motion over a plurality of primary coils. Some implementations of the wireless power transmission apparatus may enable motion detection using the primary coils without a separate position or orientation sensor. For example, the wireless power transmission apparatus may utilize the circuitry associated with each primary coil to detect the presence of a wireless power receiving apparatus in proximity to the primary coil.

In some implementations, the wireless power transmission apparatus may be capable of charging multiple wireless power receiving apparatuses concurrently based on placement of the wireless power receiving apparatuses in relation to different primary coils. Each primary coil may be independently activated or deactivated based on a detection of a wireless power receiving apparatus in proximity to the primary coil. Furthermore, it may be unnecessary to impose a limit to the orientation of the wireless power receiving apparatus. The wireless power transmission apparatus (using local controllers) may activate whichever primary coil is best suited to provide wireless power to the wireless power receiving apparatus based on the position of the wireless power receiving apparatus.

In some implementations, the wireless power transmission apparatus may be used with a traditional wireless power receiving apparatus. For example, the wireless power receiving apparatus may be manufactured according to a standardized wireless power specification, such as the Qi® specification provided by the Wireless Power Consortium. In some implementations, the wireless power receiving apparatus may be in proximity to one or more primary coils. The local controller that receives a communication from the wireless power receiving apparatus in response to a ping action may determine that the wireless power receiving apparatus is latched to its primary coil. The local controller may cause its primary coil to provide wireless energy to the secondary coil of the wireless power receiving apparatus. The local controllers that are associated with nearby primary coils may continue to ping for the presence of a second wireless power receiving apparatus.

In some implementations, the wireless power transmission apparatus may be capable of determining adjacent primary coils to activate based on an actual or predicted motion of the wireless power receiving apparatus. For example, a supervisory controller may manage multiple local controllers to coordinate the transmission of wireless power. The supervisory controller may determine a position of the wireless power receiving apparatus at a first primary coil. The supervisory controller may determine or predict a motion of the wireless power receiving apparatus in a first direction from the first primary coil to a second primary coil. Based on the predicted motion, the supervisory controller may cause the second primary coil to prepare to transmit energy. For example, the supervisory controller may cause a local controller associated with the second primary coil to change to a ready state. The ready state may include energizing the circuitry associated with the second primary coil upon enabling. It may be impractical to keep all the primary coils energized all the time due to EMI or efficiency of the wireless power transmission apparatus. However, by selectively energizing the adjacent primary coil based on a predicted motion of the wireless power receiving apparatus, the wireless power transmission apparatus can continue to charge the wireless power receiving apparatus with minimal delay. While the motion may result in a change from a first primary coil to a second primary coil, the wireless power transmission apparatus may reduce or eliminate some of the delay associated with the change. For example, a handshake process associated with activating wireless charging may be reduced or eliminated. In addition, such a seamless transfer of power to the wireless power receiving apparatus may reduce the size of energy storage required to continue operation of the wireless power receiving apparatus.

There may be different types of motion supported by this disclosure. For example, the motion may be related to an unintentional misalignment caused by vibration or other disturbance. Alternatively, the motion may be related to an intentional change in position of the wireless power receiving apparatus over the wireless power transmission apparatus. In some implementations, the wireless power receiving apparatus may be a robot or vehicle that moves in a determinable direction. For example, a server may control motion of the wireless power receiving apparatus in an environment, such as the movement of a robot in a warehouse or the movement of a car over a road surface. In some implementations, the supervisory controller may obtain control information from the server to predict the motion of the wireless power receiving apparatus.

Particular implementations of the subject matter described in this disclosure can be implemented to realize one or more of the following potential advantages. In some implementations, the described techniques can be used to enable charging of one or more wireless power receiving apparatuses in various positions or orientations. Efficiency of the wireless power transmission apparatus may be improved by selectively activating separate primary coils based on an actual or predicted position of a wireless power receiving apparatus in relation to the primary coils. In some implementations, the use of separate local controllers may reduce the complexity of a wireless power transmission apparatus having a multi-layer array of primary coils.

Figure 3:
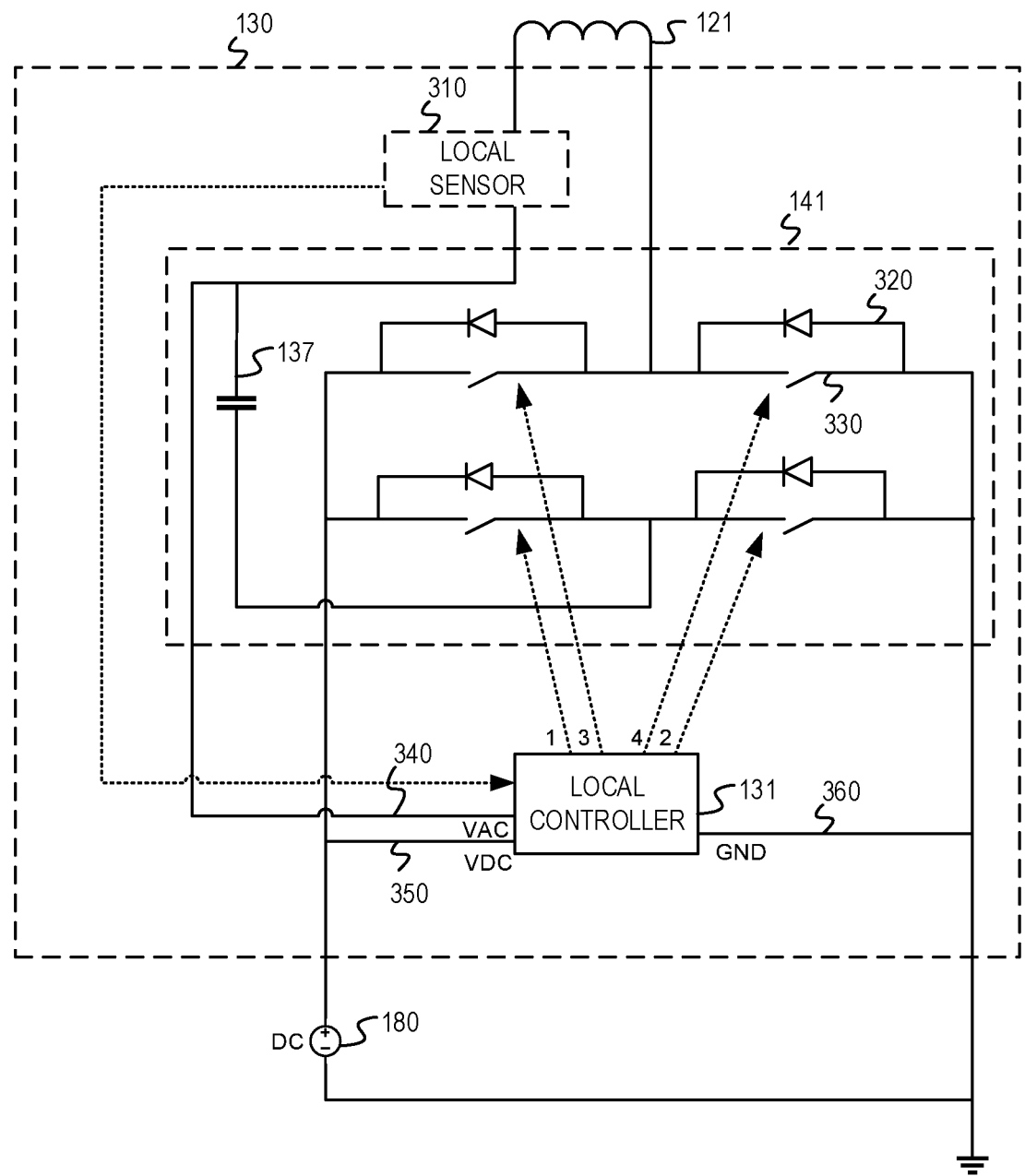
FIG. 3 shows an example transmitter circuit which may be associated with each primary coil according to some implementations.

FIG. 1 shows an example wireless power system that includes a wireless power transmission apparatus capable of charging multiple wireless power receiving apparatuses according to some implementations. The wireless power system 100 includes a wireless power transmission apparatus 110 which has multiple primary coils 120. Each of the primary coils 120 may be associated with a power signal generator and a local controller. For example, a first primary coil 121 may be associated with power signal generator 141 and managed by a first local controller 131. Similarly, a second primary coil 122 may managed by a second local controller 132. Each primary coil may be a wire coil which transmits a wireless power signal (which also may be referred to as wireless energy). The primary coil may transmit wireless energy using inductive or magnetic resonant field. The power signal generator may include components (not shown) to prepare the wireless power signal. For example, the power signal generator may include one or more switches, drivers, a series capacitors, or other components. An example of the power signal generator is shown in FIG. 3. In some implementations, the power signal generator, local controller, and other components (not shown) may be collectively referred to as transmitter circuit 130. In some implementations, some or all of the transmitter circuit 130 is embodied as an IC that implements features of this disclosure for independent or distributed control of separate primary coils. The wireless power transmission apparatus 110 may include a power source 180 which is configured to provide power to each of the transmitter circuits in the wireless power transmission apparatus 110. The power source 180 may convert alternating current (AC) to direct current (DC).

The local controllers may be configured to detect the presence or proximity of a wireless power receiving apparatus. For example, the local controllers may cause their associated primary coils to periodically transmit a detection signal and measure for a change in coil current or load that indicates an object near the primary coil. In some implementations, the local controller may detect a ping, wireless communication, load modulation, or the like, to determine that a wireless power receiving apparatus is placed on the wireless power transmission apparatus. In some implementations, the transmitter circuits may perform detection at random times and may operate independently to detect a wireless power receiving apparatus. In some implementations, the transmitter circuits may be configured to perform a detection phase in a pattern such that neighboring primary coils perform the detection phase at deterministic times to reduce neighbor coil interference.

FIG. 1 shows a first wireless power receiving apparatus 210 and a secondary coil 220. The first wireless power receiving apparatus 210 and the secondary coil 220 are examples of wireless power receiving apparatuses. A wireless power receiving apparatus may be any type of device capable of receiving wireless power, including a mobile phone, computer, laptop, peripheral, gadget, robot, vehicle, or the like. In one example, the first wireless power receiving apparatus 210 may be a movable device (such as a computer mouse, or the like) and the wireless power transmission apparatus 110 may be embodied as a surface for transmitting power to the movable device while the movable device is in motion. In another example, the first wireless power receiving apparatus 210 may be a robot for use in a home, business, warehouse, or other location, and the wireless power transmission apparatus 110 may be embodied as a floor mat or integrated in a floor. In yet another example, the first wireless power receiving apparatus 210 may be an electric power vehicle and the wireless power transmission apparatus 110 may be embodied in a roadway, parking lot, or the like.

When a wireless power receiving apparatus (such as the first wireless power receiving apparatus 210) is placed on the wireless power transmission apparatus 110 near the first primary coil 121, the first local controller 131 may detect its presence. For example, during a detection phase, the first primary coil 121 may transmit a detection signal (which also may be referred to as a ping). The coil current at the first primary coil 121 may be measured to determine whether the coil current has crossed a threshold indicating an object in the electromagnetic field of the first primary coil 121. If an object is detected, the first local controller 131 may wait for a handshake signal from the first wireless power receiving apparatus 210 (such as an identification signal or setup signal) to determine whether the object is a wireless power receiving apparatus or a foreign object. The handshake signal may be communicated by the first wireless power receiving apparatus 210 using a series of load changes (such as load modulations). The load changes may be detectable by a coil sensing circuit and interpreted by the first primary coil 121. The first primary coil 121 may interpret the variations in the load to recover the communication from the first wireless power receiving apparatus 210. The communication may include information such as charging level, requested voltage, received power, receiver power capability, support for a wireless charging standard, or the like.

The first wireless power receiving apparatus 210 may include a secondary coil 220, a rectifier 230, a receive (RX) controller 240 and an optional battery module 250. In some implementations, the battery module 250 may have an integrated charger (not shown). The secondary coil 220 may generate an induced voltage based on the received wireless power signal from the first primary coil 121. A capacitor (not shown) may be in series between the secondary coil 220 and the rectifier 230. The rectifier 230 may rectify the induced voltage and provide the induced voltage to the battery module 250. The battery module 250 may include a charger stage, protection circuits such as a temperature-detecting circuit, and overvoltage and overcurrent protection circuits. Alternatively, the receive controller 240 may include a battery charging management module to collect and process information on a charging state of the battery module 250. In some implementations, the receive controller 240 may be configured to communicate with the first local controller 131 using load modulation via the secondary coil 220.

The wireless power system 100 of FIG. 1 includes a second wireless power receiving apparatus 260 that is near the second primary coil 122. As described above, the second local controller 132 may control the second primary coil 122 separately from the other transmitter circuits. Thus, the second local controller 132 may cause the second primary coil 122 to transmit wireless power to the second wireless power receiving apparatus 260 while the first local controller 131 causes the first primary coil 121 to transmit wireless power to the first wireless power receiving apparatus 210. Furthermore, the first local controller 131 and the second local controller 132 may manage the parameters associated with wirelessly charging at their respective primary coils. For example, the voltage level, resonant frequency, power level, or other parameter may be different for each of the first primary coil 121 and the second primary coil 122 based on the type of wireless power receiving apparatus or charging level of their respective batteries.

In some implementations, the wireless power transmission apparatus 110 may include a supervisory controller 170. When present, the supervisory controller 170 may coordinate the operations of multiple local controllers. For example, the supervisory controller 170 may manage the pattern for detection phase by each transmitter circuit. In some implementations, the supervisory controller 170 may assist the local controllers to determine which transmitter circuit is best suited to wirelessly charge a particular wireless power receiving apparatus. For example, the local controllers may report detection phase information (such as coil current sensing measurements) to the supervisory controller 170. The supervisory controller 170 may compare the detection phase information to determine that one transmitter circuit has a better alignment with the wireless power receiving apparatus. In some implementations, the supervisory controller 170 may cause neighboring transmitter circuits to deactivate wireless power signals to decrease neighbor interference. In some implementations, the supervisory controller 170 may cause a neighbor transmitter circuit to be in a "ready state" such that the neighbor transmitter circuit is ready to transmit wireless power if the wireless power receiving apparatus moves in a direction of the neighbor transmitter circuit. The coordination by the supervisory controller 170 may eliminate or reduce some of the detection phase or communication typically involved with activating charging between a primary coil and a secondary coil. Aspects related to the optional supervisory controller 170 and movement of the wireless power receiving apparatus are further described in FIGS. 4-6.

Figure 2:
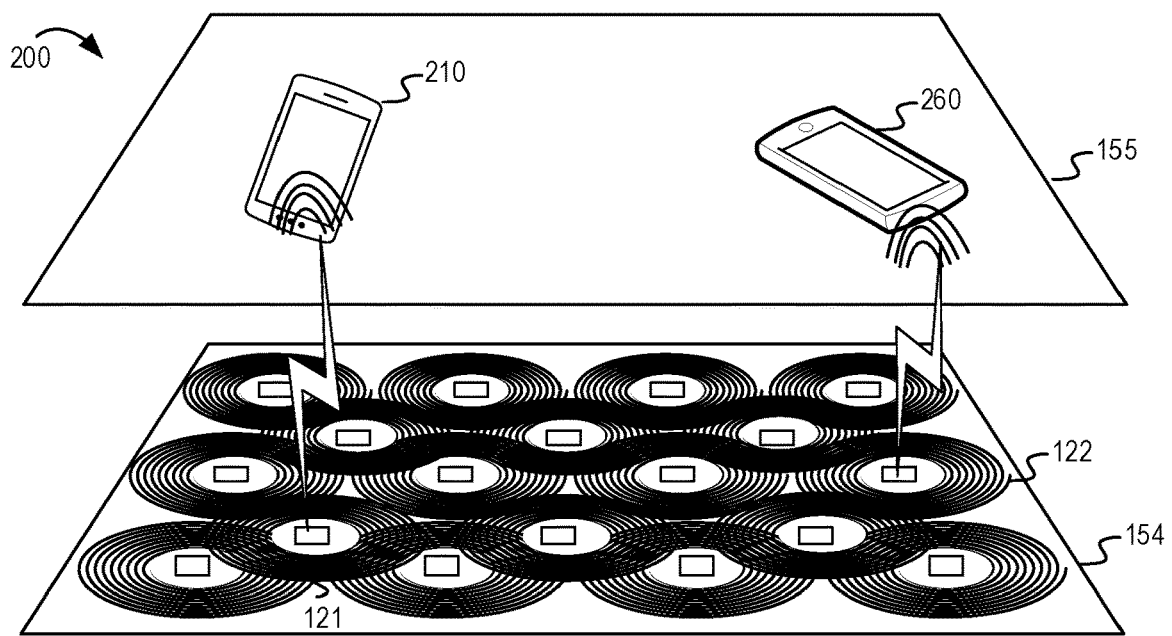
FIG. 2 shows an example wireless power transmission apparatus having multiple layers of primary coils arranged in an overlapping pattern according to some implementations.
Figure 2:
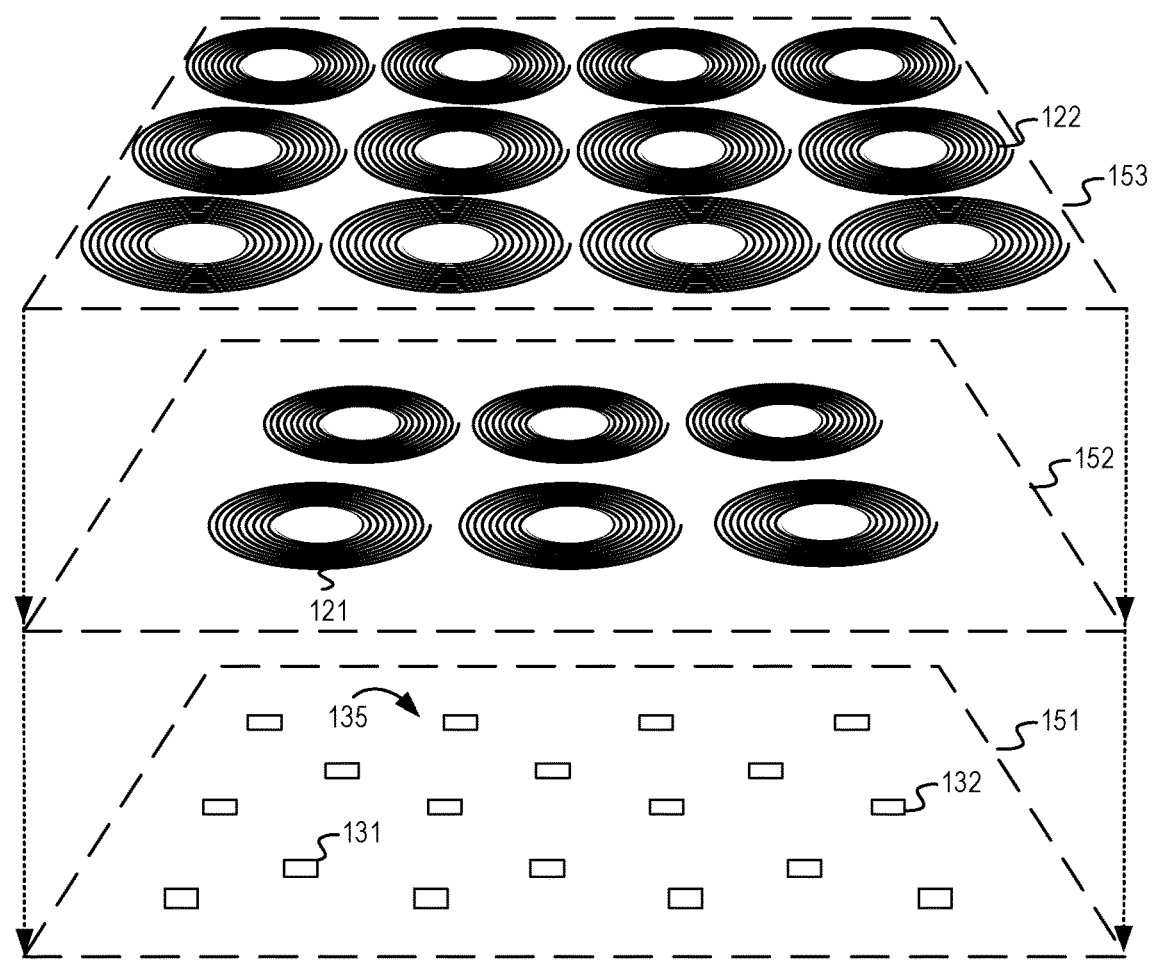

FIG. 2 shows an example wireless power transmission apparatus having multiple layers of primary coils arranged in an overlapping pattern according to some implementations. The example wireless power transmission apparatus 200 includes 18 primary coils arranged in two overlapping layers. However, the quantity and arrangement of primary coils are provided as an example. Other quantities of primary coils, number of layers, or arrangements may be possible.

Beginning from the bottom 151, a number of local controllers 135 are shown, including a first local controller 131 and a second local controller 132. The local controllers do not necessarily need to be placed directly under their associated primary coil. However for ease of illustration they are shown in the same configuration as their corresponding primary coils which are locate in a first layer 152 and a second layer 153. For example, the first primary coil 121 is shown on the first layer 152, along with several other primary coils. The second primary coil 122 is shown on the second layer 153 with other primary coils. A combined view 154 shows the coils overlapping with their corresponding local controllers in the center of each coil. Again, this depiction is provided for ease of illustration. In some implementations, the quantity of coils and overlap may be such that there are few or no dead zones in the charging surface 155. In addition to the wireless power transmission apparatus 200, FIG. 2 shows the first wireless power receiving apparatus 210 and the second wireless power receiving apparatus 260 placed on the charging surface 155. The first wireless power receiving apparatus 210 is able to latch and receive wireless power from the first primary coil 121 based on its position over that transmitter circuit. Similarly, the second wireless power receiving apparatus 260 may latch and receive wireless power from the second primary coil 122.

Various optional features may be incorporated into the design of the wireless power transmission apparatus. For example, in some implementations, ferrite material may be used in portions of the wireless power transmission apparatus to maintain a magnetic field with no (or few) dead zones. The ferrite material may be used to evenly distribute the electromagnetic field. In some implementations, the shape of the coils, amount of overlap, and materials may be selected to improve efficiency, reduce dead zones, or both.

In one example implementation, the first wireless power receiving apparatus 210 may be a movable device (such as a computer mouse, or the like). The charging surface 155 may be a mouse pad, desktop, or the like, on which the movable device operates. A mouse is described as an example of a movable device for brevity in this disclosure. As the mouse moves about the charging surface 155, different primary controllers can charge the mouse. For example, each transmitter circuit may detect the mouse for a time while the mouse is in a position over its corresponding primary coil. When the mouse moves to another position, the original transmitter circuit may discontinue wireless power transfer and the new transmitter circuit (at the new position) may perform the wireless power transfer.

FIG. 3 shows an example transmitter circuit which may be associated with each primary coil according to some implementations. As mentioned above, in some implementations, the transmitter circuit 130 may be embodied as an integrated circuit. Alternatively, the some or all of the components of the transmitter circuit 130 may be implemented as separate electrical components on a printed circuit board. In FIG. 3, the power source 180 and the first primary coil 121 are shown for reference as possible connections to the transmitter circuit 130. In some implementations, the connections between the power source 180, the transmitter circuit 130, and the first primary coil 121 may be accomplished using a printed circuit board.

The example transmitter circuit 130 in FIG. 3 is one of a multitude of designs which could be used with the present disclosure. In the design of FIG. 3, the first local controller 131 receives DC power using a DC input line 350 electrically coupled to the power source 180. The DC power may be a particular voltage (such as 5V or 12V). Alternatively, the local controller may include a power conditioning stage to cater to the voltage requirements of the sub modules in the local controllers. The same DC voltage may be electrically coupled to several switches, such as switch 330. The switch 330 may include a semiconductor switch such as a metal-oxide-semiconductor field-effect transistor (MOSFET), an insulated gate bipolar transistor (IGBT), or the like. Alternatively, the switch 330 may include a mechanical switch. In the example of FIG. 3, each switch may be paired with a diode 320. Other components (such as a driver) are not shown in the figure but may be included in the path.

The first local controller 131 also may switch the devices to covert the power source 180 from a DC output to an AC output across center points of the two legs of the bridge. The coil voltage VAC is fed to the local controller using the link 340. The switches can be used to control the applied voltage to the capacitor-primary coil pair. For example, the first local controller 131 may vary the duty ratio of each switch leg, the phase angle of applied voltage between the switch legs, the frequency of the applied voltage, or both. The first local controller 131, switches, drivers, diodes, and the like, may be referred to as the power signal generator 141. In some implementations, the drivers may be incorporated in the first local controller 131. Furthermore, the first local controller 131 may control the power signal generator 141 using outputs (marked 1, 2, 3, 4) to each of the switches. The first local controller 131 and switches may be electrically coupled to a ground line 360 to complete the circuit. The capacitor and primary coil form a resonant circuit.

In some implementations, the transmitter circuit 130 may include a coil current sensing circuit, which is referred to as a local sensor 310 in this disclosure. The transmitter circuit 130 may be capable of detecting a load change on the first primary coil 121. The local sensor 310 may be a current sensor connected in series with the first primary coil 121. The first local controller 131 may determine whether an object is present based on the load change measured by the local sensor 310. The local controller may use the sensed current, the sensed voltage VAC 340 or combination thereof to determine the load change. A communication unit (not shown) also may be present or may be incorporated in the first local controller 131. The communication unit may monitor load changes measured by the local sensor 310 and/or VAC 340 to decode load modulated data. The communication unit may receive identification (ID), charging state information, voltage control information, or other information reported by a wireless power receiving apparatus.

The transmitter circuit 130 described in FIG. 3 may be duplicated in a wireless power transmission apparatus. For example, there may be a different transmitter circuit for each primary coil of the wireless power transmission apparatus. Other designs may be possible. For example, the first local controller 131 may control more than one primary coil. Alternatively, an IC may include multiple transmitter circuits to independently control different primary coils. Because the primary coils may be independently controlled by their corresponding local controllers, it is possible to simplify the design of a zoneless, free-position charging pad. For example, each primary coil is driven and controlled by separate transmitter circuit that can detect the wireless power receiving apparatuses. Only those primary coils that have a wireless power receiving apparatus present will be energized for charging. The design may eliminate or reduce the need for additional position sensors or orientation sensors to detect the location of the wireless power receiving apparatus on the charging pad. EMI can be reduced by deactivating the primary coils that do not have a wireless power receiving apparatus present. Furthermore, the wireless power receiving apparatus may have different orientations (supported by different primary coils).

Although described as a charging pad, the structure of the wireless power transmission apparatus may be different. For example, the wireless power transmission apparatus may be located in a vehicle, a piece of furniture, a part of a wall, a floor, or the like. In some implementations, the wireless power transmission apparatus may be integrated as part of a table top, coffee table, desk, counter, or the like.

Figure 4:
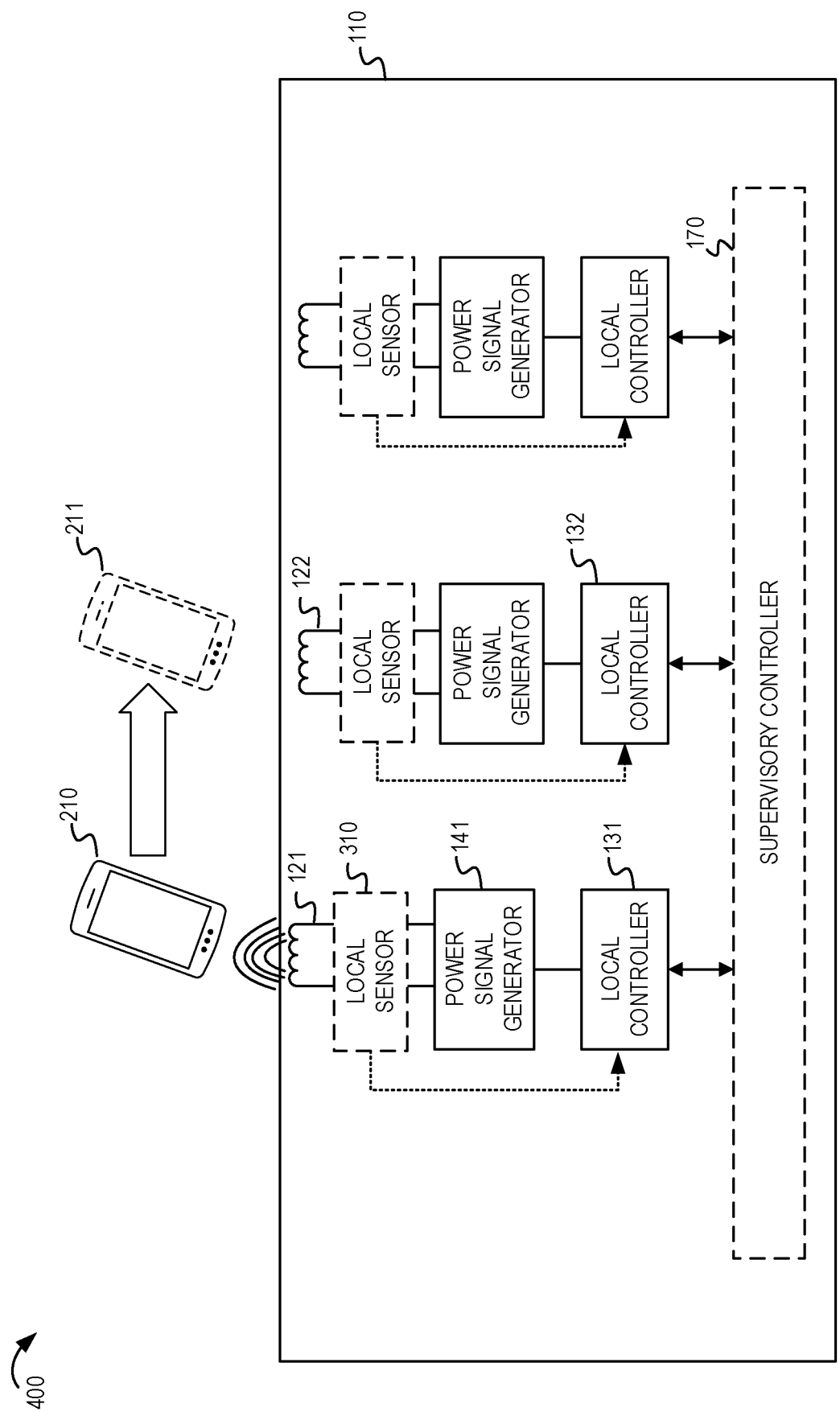
FIG. 4 shows an example wireless power transmission apparatus having a supervisory controller for coordinating multiple local controllers based on local object detection according to some implementations.
Figure 5:
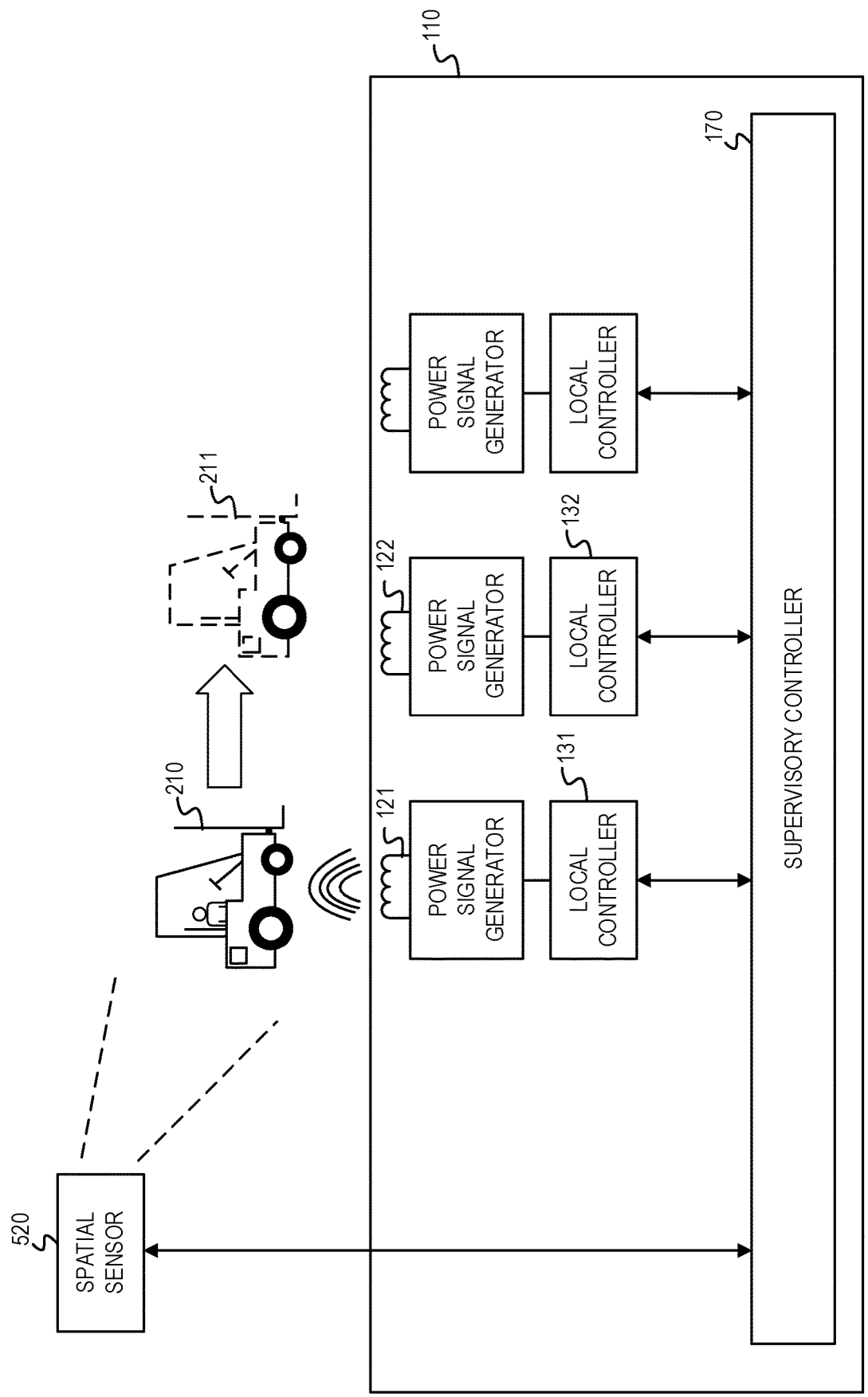
FIG. 5 shows an example wireless power transmission apparatus having a supervisory controller for coordinating multiple local controllers based on spatial sensor according to some implementations.
Figure 6:
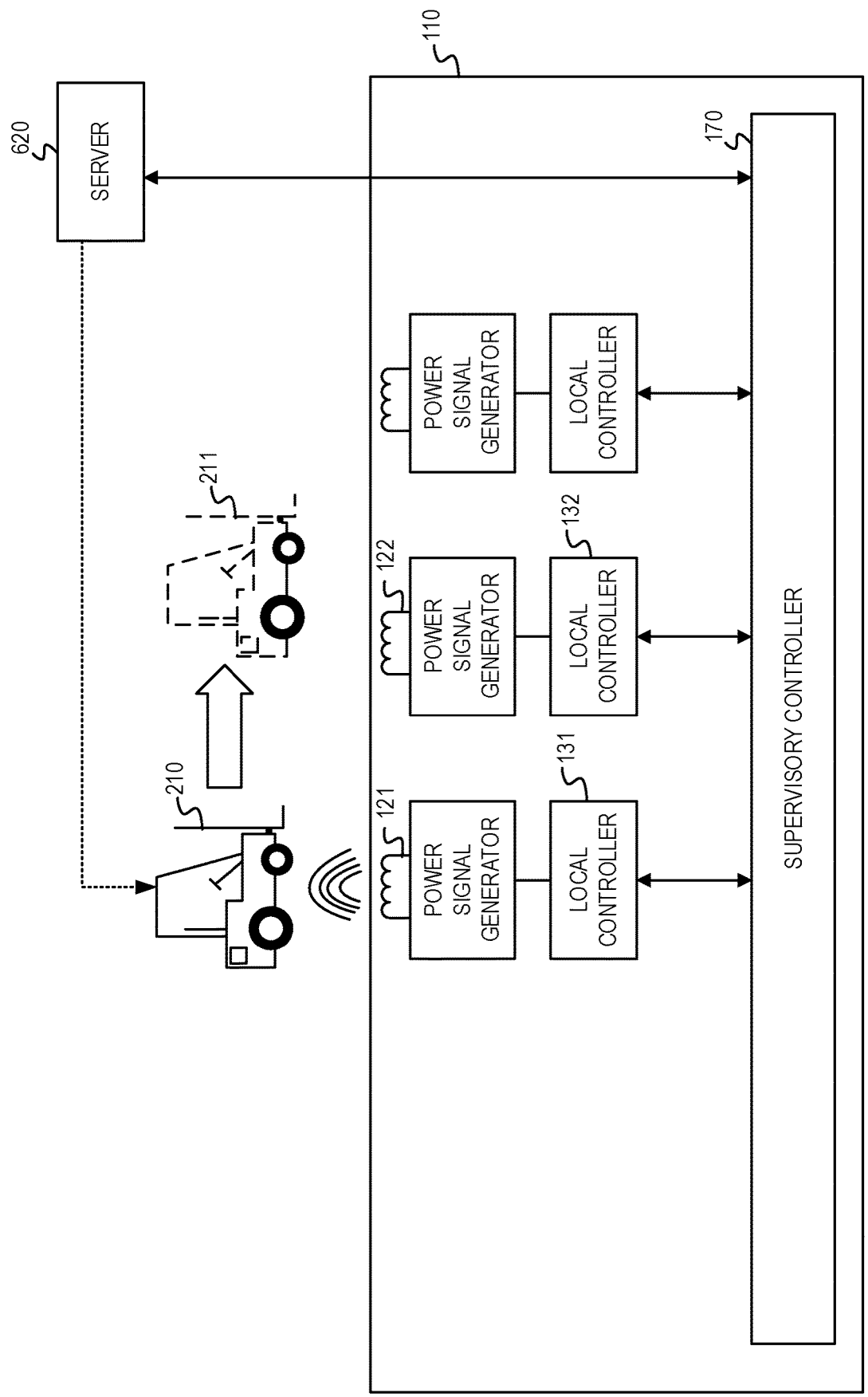
FIG. 6 shows an example wireless power transmission apparatus having a supervisory controller for coordinating multiple local controllers based on control information from a server according to some implementations.

FIGS. 4-6 describes several implementations involvement movement of a wireless power receiving apparatus. For brevity, the second wireless power receiving apparatus is removed in FIGS. 4-6. However, the features of FIGS. 4-6 may be implemented with multiple wireless power receiving apparatuses. Furthermore, the features described in FIGS. 4-6 may be used for stationary wireless power receiving apparatuses as well as those that move in relation to the wireless power transmission apparatus 110. A wireless power receiving apparatus may change position or orientation after being placed on the wireless power transmission apparatus, either unintentionally or intentionally, due to the nature of the system. For example, the motion may be related to an unintentional misalignment caused by vibration or other disturbance. Alternatively, the motion may be related to an intentional change in position of the wireless power receiving apparatus over the wireless power transmission apparatus. Regardless of the reason for the motion, the motion may cause the secondary coil to become misaligned from the primary coil. Conventional multi coil transmitters would cut power after a misalignment. This may cause a delay in establishing power protocol between the wireless power receiving apparatus and the nearest primary coil to which the secondary coil becomes aligned after the movement. The delay in establishing a wireless charging signal may result in the wireless power receiving apparatus not getting power during the delay time. In accordance with some implementations of this disclosure, a supervisory controller may keep the adjacent transmitter circuits ready to transmit power when the wireless power receiving apparatus moves.

FIG. 4 shows an example wireless power transmission apparatus having a supervisory controller for coordinating multiple local controllers based on local object detection according to some implementations. The wireless power system 400 includes the wireless power transmission apparatus 110 and the first wireless power receiving apparatus 210 as described in FIG. 1. Initially, the first wireless power receiving apparatus 210 may be latched and receiving wireless power via the first primary coil 121. For example, the local sensor 310 may detect a change in the coil current which indicates that the first wireless power receiving apparatus 210 is present. The first local controller 131 and the first wireless power receiving apparatus 210 may implement a detection phase, identification phase, setup phase, or any combination thereof, to establish wireless charging. Then the first local controller 131 may cause the power signal generator 141 to transmit wireless power according to a set of parameters. For example, the parameters may include a voltage level, switching frequency, frequency of transmission, power level, or the like.

The first local controller 131 may be in communication with a supervisory controller 170. For example, the first local controller 131 may inform the supervisory controller 170 that it has detected the first wireless power receiving apparatus 210. In some implementations, the first local controller 131 may share information related to the local sensor 310. In some implementations, the first local controller 131 may share other information, such as the set of parameters implemented at the power signal generator 141 for the wireless charging.

The supervisory controller 170 may determine that the second primary coil 122 is an adjacent (neighbor) primary coil. For example, the supervisory controller 170 may have a spatial relationship table or other information to indicate which primary coils are next to the first primary coil 121. In the example of FIG. 4, the second primary coil 122 is next to the first primary coil 121. Although FIG. 4 shows only 3 transmitter circuits, there may be multiple transmitter circuits and the supervisory controller 170 may coordinate with several adjacent (neighbor) transmitter circuits. For brevity, the description of FIGS. 4-6 describe the coordination with just one transmitter circuit (associated with the second local controller 132). The supervisory controller 170 may cause the second local controller 132 to enter a ready state to take over wireless charging if or when the first wireless power receiving apparatus 210 moves to the new position (shown at position 211). For example, the supervisory controller 170 may send information such as the set of parameters to the second local controller 132. The second local controller 132 may configure its power signal generator without causing the second primary coil 122 to send wireless power until the first wireless power receiving apparatus 210 is detected at position 211. The second local controller 132 may periodically send a detection signal and detect the coil current to determine when the first wireless power receiving apparatus 210 is at position 211. Because the second local controller 132 has been pre-configured in the ready state, the second local controller 132 may take over wireless charging with little or no delay. For example, the second local controller 132 may skip or reduce the detection phase, identification phase, setup phase, or any combination thereof, that would otherwise be used to establish wireless charging between the second primary coil 122 and the first wireless power receiving apparatus 210.

In some implementations, the second local controller 132 may inform the supervisory controller 170 when it has taken over the wireless charging. The supervisory controller 170 may cause the first local controller 131 to discontinue charging so that the first primary coil 121 does not cause interference for the second primary coil 122. The first local controller 131 may stay in a ready state in case the first wireless power receiving apparatus 210 returns to the original position. When the first wireless power receiving apparatus 210 is no longer at the neighboring second primary coil 122 and is not located at a primary coil that is adjacent to the first primary coil 121, the first local controller 131 may change from a ready state to a dormant or inactive state. The first local controller 131 may periodically perform a detection phase to detect for the return of the first wireless power receiving apparatus 210 or another wireless power receiving apparatus.

The supervisory controller 170 in FIGS. 4-6 is shown as a separate component in the wireless power transmission apparatus 110. However, in some implementations, the supervisory controller 170 may be functionally distributed in the multiple local controllers which may communicate via a bus or other interconnection between the local controllers. In some implementation, the supervisory controller 170 and multiple transmitter circuits may be embodied in a single IC.

FIG. 5 shows an example wireless power transmission apparatus having a supervisory controller for coordinating multiple local controllers based on spatial sensor according to some implementations. In some implementations, a spatial sensor 520 may be external to the wireless power transmission apparatus 110, as shown in FIG. 5. Alternatively, the spatial sensor 520 may be integrated as a sensor in the wireless power transmission apparatus 110 that is not specific to a particular transmitter circuit. The spatial sensor 520 may be configured to determine a position of the first wireless power receiving apparatus 210 in an environment. In the example of FIG. 5, the first wireless power receiving apparatus 210 is depicted as a forklift, such as one that may be found in a warehouse. However, the first wireless power receiving apparatus 210 may be any type of device, including a mobile phone, computer, gadget robot, vehicle, or the like. FIG. 5 shows an implementation of this disclosure in which the wireless power transmission apparatus 110 is integrated into a road or floor surface.

The spatial sensor 520 may be configured to determine the position of the first wireless power receiving apparatus 210. For example, the spatial sensor 520 may include a camera, a light sensor, an auditory sensor, an infrared sensor, a radio frequency (RF) energy sensor, RF identification (RFID) sensor, or any combination thereof. In some implementations, the spatial sensor 520 may track the location of the first wireless power receiving apparatus 210 as it moves in the environment (such as a movement to position 211). The spatial sensor 520 may communicate the current location or direction of movement to the supervisory controller 170. Based on the information from the spatial sensor 520, the supervisory controller 170 may determine a current or predicted location of the first wireless power receiving apparatus 210. For example, the supervisory controller 170 may determine that the first wireless power receiving apparatus 210 is moving from the position over the first primary coil 121 to the second primary coil 122. The supervisory controller 170 may coordinate with the first local controller 131 and the second local controller 132 to assist with transferring the wireless charging from the first primary coil 121 to the second primary coil 122. In some implementations, the supervisory controller 170 may provide a seamless (or semi-continuous) wireless charging session as the first wireless power receiving apparatus 210 moves among multiple primary coils.

In some implementations, the spatial sensor 520 may be located in the first wireless power receiving apparatus 210. For example, the spatial sensor 520 may be a location based service (such as GPS, or the like) of the first wireless power receiving apparatus 210. The spatial sensor 520 may report location coordinates, direction, speed, or other information to the supervisory controller 170.

FIG. 6 shows an example wireless power transmission apparatus having a supervisory controller for coordinating multiple local controllers based on control information from a server according to some implementations. A server 620 may be configured to monitor or control the movement of the first wireless power receiving apparatus 210. For example, the server 620 may control movement of a stock loading robot, a cleaning robot, or the like. The server 620 may be integrated in the first wireless power receiving apparatus 210 or may be an external server that manages one or more robots, vehicles, or devices. The supervisory controller 170 may be communicatively coupled to the server 620 and may receive location information from the server 620. Based on the information from the spatial sensor 520, the supervisory controller 170 may determine a current or predicted location of the first wireless power receiving apparatus 210. For example, the supervisory controller 170 may determine that the first wireless power receiving apparatus 210 is moving from the position over the first primary coil 121 to the second primary coil 122. The supervisory controller 170 may coordinate with the first local controller 131 and the second local controller 132 to assist with transferring the wireless charging from the first primary coil 121 to the second primary coil 122.

In some implementations, the server 620 may control the first wireless power receiving apparatus 210, such that the server 620 knows in advance which position 211 the first wireless power receiving apparatus 210 will occupy at a particular time. The server 620 may use this information to cause the supervisory controller 170 to preconfigure the second local controller 132 to a ready state in advance of when the first wireless power receiving apparatus 210 reaches that position 211.

Figure 7:
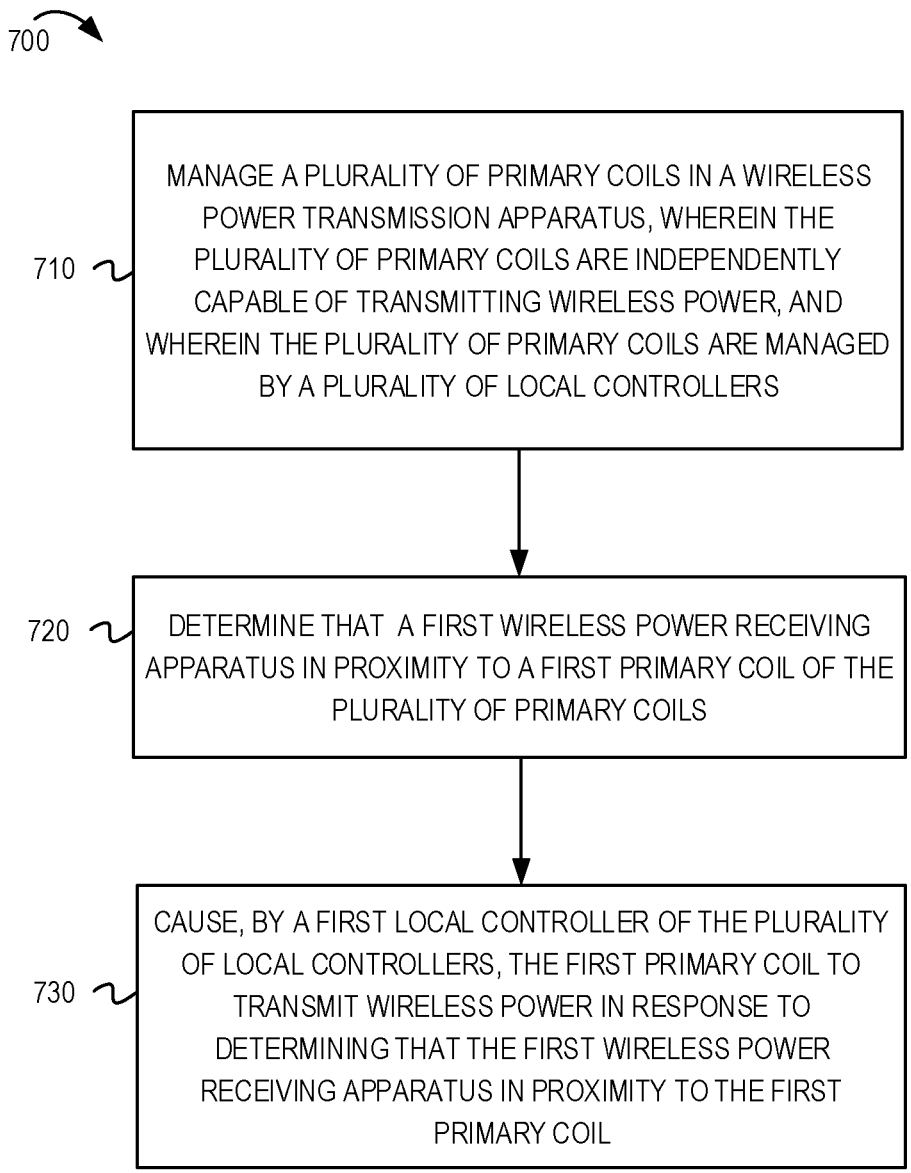
FIG. 7 shows a flowchart illustrating an example process for wireless power transmission according to some implementations.

FIG. 7 shows a flowchart illustrating an example process for wireless power transmission according to some implementations. The flowchart 700 begins at block 710. At block 710, a wireless power transmission apparatus may manage a plurality of primary coils in the wireless power transmission apparatus. The plurality of primary coils may be independently capable of transmitting wireless power. The plurality of primary coils may be managed by a plurality of local controllers. At block 720, the wireless power transmission apparatus may detect a first wireless power receiving apparatus in proximity to a first primary coil of the plurality of primary coils. For example, the a first local controller associated with the first primary coil may detect the presence of the wireless power receiving apparatus based on a coil current sensing measurement following a detection signal. At block 730, the wireless power transmission apparatus may cause, by a first local controller, the first primary coil to transmit wireless power in response to detecting the first wireless power receiving apparatus in proximity to the first primary coil.

Figure 8:
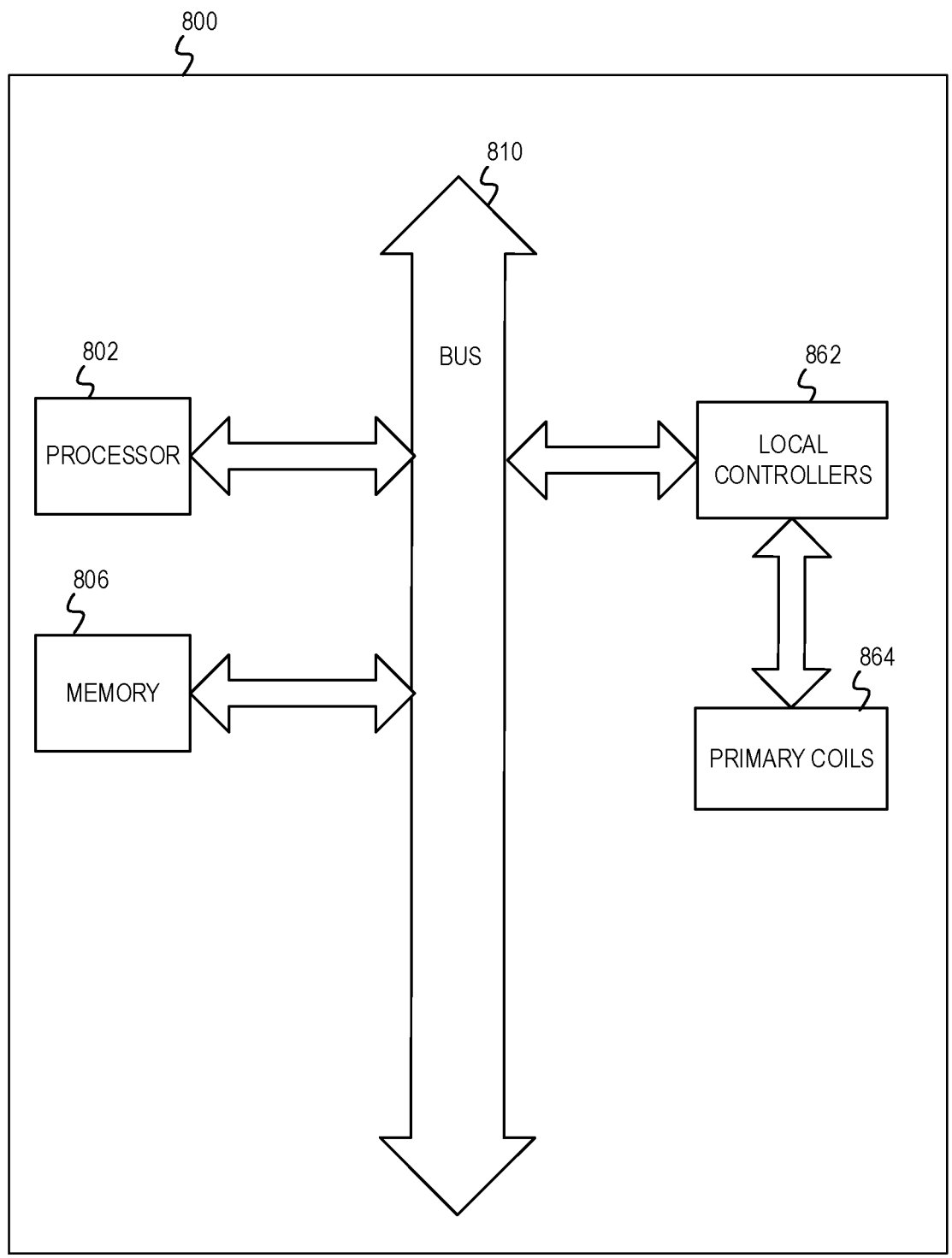
FIG. 8 shows a block diagram of an example electronic device for use in wireless power system according to some implementations.

FIG. 8 shows a block diagram of an example electronic device for use in wireless power system according to some implementations. In some implementations, the electronic device 800 may be a wireless power transmission apparatus (such as the wireless power transmission apparatus 110). The electronic device 800 can include a processor 802 (possibly including multiple processors, multiple cores, multiple nodes, or implementing multi-threading, etc.). The electronic device 800 also can include a memory 806. The memory 806 may be system memory or any one or more of the possible realizations of computer-readable media described herein. The electronic device 800 also can include a bus 810 (such as PCI, ISA, PCI-Express, HyperTransport®, InfiniBand®, NuBus®, AHB, AXI, etc.).

The electronic device 800 may include multiple local controllers 862 configured to manage multiple primary coils 864. In some implementations, the local controllers 862 can be distributed within the processor 802, the memory 806, and the bus 810. The local controllers 862 may perform some or all of the operations described herein. The memory 806 can include computer instructions executable by the processor 802 to implement the functionality of the implementations described in FIGS. 1-7. Any one of these functionalities may be partially (or entirely) implemented in hardware or on the processor 802. For example, the functionality may be implemented with an application specific integrated circuit, in logic implemented in the processor 802, in a co-processor on a peripheral device or card, etc. Further, realizations may include fewer or additional components not illustrated in FIG. 8. The processor 802, the memory 806, and the local controllers 862 may be coupled to the bus 810. Although illustrated as being coupled to the bus 810, the memory 806 may be coupled to the processor 802.

FIGS. 1-8 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless power transmission apparatus, comprising:
   a plurality of primary coils including at least a first primary coil and a second primary coil that are independently capable of transmitting wireless power, wherein the second primary coil is adjacent to the first primary coil; and
   a plurality of local controllers including at least a first local controller configured to manage the first primary coil and a second local controller configured to manage the second primary coil, wherein, in response to a determination that a first wireless power receiving apparatus is in proximity to the first primary coil:
   the first local controller is configured cause the first primary coil to transmit wireless power, and
   the second local controller is configured to change to a ready state such that the second local controller is ready to cause the second primary coil to transmit wireless power in response to a determination that the first wireless power receiving apparatus has moved from the first primary coil to the second primary coil.

2. The wireless power transmission apparatus of claim 1, further comprising:
   a charging pad on which multiple wireless power receiving apparatuses may be placed, wherein the plurality of primary coils are arranged in an overlapping pattern that is distributed among multiple layers of the charging pad.

3. The wireless power transmission apparatus of claim 1, wherein, when energized, the plurality of primary coils are arranged to create a magnetic field without dead zones in a charging surface of the wireless power transmission apparatus.

4. The wireless power transmission apparatus of claim 1, wherein the first wireless power receiving apparatus is a movable device, and wherein the wireless power transmission apparatus includes a surface for transmitting power to the movable device while the movable device is in motion.

5. The wireless power transmission apparatus of claim 1, wherein the second local controller is configured cause at least a second primary coil of the plurality of primary coils to transmit wireless power in response to a determination that a second wireless power receiving apparatus is in proximity to the second primary coil.

6. The wireless power transmission apparatus of claim 5, wherein the first primary coil and the second primary coil are configured to concurrently transmit wireless power to the first wireless power receiving apparatus and the second wireless power receiving apparatus, respectively.

7. The wireless power transmission apparatus of claim 6, comprising:
   the first local controller configured to manage a first voltage of the wireless power transmitted by the first primary coil to the first wireless power receiving apparatus, and
   the second local controller configured to manage a second voltage of the wireless power transmitted by the second primary coil to the second wireless power receiving apparatus.

8. The wireless power transmission apparatus of claim 1, further comprising:
   at least a first local sensor configured to detect an object in proximity to the first primary coil based on a coil current measurement; and
   the first local controller configured to determine that the object is the first wireless power receiving apparatus based on load variations in a series of coil current measurements.

9. The wireless power transmission apparatus of claim 8, wherein the first local controller is configured to determine that the object is the first wireless power receiving apparatus based, at least in part, on decoding load modulated data associated with the load variations.

10. The wireless power transmission apparatus of claim 1, further comprising:
    a plurality of local sensors configured to detect load variations associated with corresponding ones of the plurality of primary coils.

11. The wireless power transmission apparatus of claim 10,
    wherein each local controller is associated with a corresponding local sensor and corresponding primary coil, and
    wherein each local controller is configured to manage one or more primary coils in response to the load variations detected by the corresponding local sensor.

12. The wireless power transmission apparatus of claim 1, further comprising:
    one or more communication units configured to communicate with the first wireless power receiving apparatus via one or more primary coils, wherein the first wireless power receiving apparatus is determined to be in proximity to the first primary coil is based, at least in part, on a first communication received from the first wireless power receiving apparatus via the first primary coil.

13. The wireless power transmission apparatus of claim 1,
wherein the first wireless power receiving apparatus is
embodied as a vehicle for transporting people or goods,
and
wherein the wireless power transmission apparatus is
embodied in a floor or road surface.

14. The wireless power transmission apparatus of claim 1,
further comprising:
a supervisory controller configured to coordinate operations of the plurality of local controllers.

15. The wireless power transmission apparatus of claim 14, wherein the supervisory controller is configured to coordinate a detection phase performed by the plurality of local controllers to cause neighboring local controllers to perform the detection phase at deterministic times.

16. The wireless power transmission apparatus of claim 14, wherein the supervisory controller is configured to coordinate the wireless charging of the plurality of local controllers based, at least in part, on a position of the first wireless power receiving apparatus in relation to the plurality of primary coils.

17. The wireless power transmission apparatus of claim 16, wherein the supervisory controller is configured to determine the position based, at least in part, on an indication from the first local controller that the first wireless power receiving apparatus in proximity to the first primary coil.

18. The wireless power transmission apparatus of claim 16, wherein the first local controller is configured to determine the position of the first wireless power receiving apparatus in relation to multiple primary coils of the plurality of primary coils.

19. The wireless power transmission apparatus of claim 16, wherein the supervisory controller is communicatively coupled with at least a first spatial sensor configured to detect the position of the first wireless power receiving apparatus in relation to multiple primary coils of the plurality of primary coils, and wherein the first spatial sensor includes at least one of a camera, a light sensor, an auditory sensor, an infrared sensor, or a radio frequency energy sensor.

20. The wireless power transmission apparatus of claim 14, wherein the supervisory controller is configured to communicate with the second local controller to cause the second primary coil to transmit wireless power in response to the determination that the first wireless power receiving apparatus has moved from the first primary coil to the second primary coil.

21. The wireless power transmission apparatus of claim 20, wherein the supervisory controller is configured to communicate with the first local controller to cause the first primary coil to stop transmitting wireless power to the first wireless power receiving apparatus in response to the determination that the first wireless power receiving apparatus has moved from the first primary coil to the second primary coil.

22. The wireless power transmission apparatus of claim 14, wherein the supervisory controller is configured to predict a motion of the first wireless power receiving apparatus in a first direction from the first primary coil to the second primary coil based on a change in the position of the first wireless power receiving apparatus in relation to the plurality of primary coils.

23. The wireless power transmission apparatus of claim 22, wherein the supervisory controller is communicatively coupled with a server that controls the first wireless power receiving apparatus, and wherein the supervisory controller is configured to predict the motion of the first wireless power receiving apparatus based on control information obtained from the server.

24. A method comprising:
managing a plurality of primary coils in a wireless power transmission apparatus, wherein the plurality of primary coils include at least a first primary coil and a second primary coil that are independently capable of transmitting wireless power, wherein the second primary coil is adjacent to the first primary coil, and wherein the plurality of primary coils are managed by a plurality of local controllers that includes at least a first local controller configured to manage the first primary coil and a second local controller configured to manage the second primary coil;
determining that a first wireless power receiving apparatus is in proximity to a first primary coil of the plurality of primary coils; and
in response to determining that the first wireless power receiving apparatus in proximity to the first primary coil:
causing, by the first local controller, the first primary coil to transmit wireless power, and
changing a second local controller to a ready state such that the second local controller is ready to cause the second primary coil to transmit wireless power in response to a determination that the first wireless power receiving apparatus has moved from the first primary coil to the second primary coil.

25. The method of claim 24, further comprising:
determining that a second wireless power receiving apparatus in proximity to a second primary coil of the plurality of primary coils; and
causing, by a second local controller of the plurality of local controllers, the second primary coil to transmit wireless power in response to determining that the second wireless power receiving apparatus in proximity to the second primary coil,
wherein the first primary coil and the second primary coil are configured to concurrently transmit wireless power to the first wireless power receiving apparatus and the second wireless power receiving apparatus, respectively.

26. The method of claim 24, further comprising coordinating operations of the plurality of local controllers based on a position or movement of the wireless power reception apparatus relative to the plurality of coils.

27. The method of claim 24, further comprising coordinate, by a supervisory controller, a detection phase performed by the plurality of local controllers to cause neighboring local controllers to perform the detection phase at deterministic times.

28. The method of claim 27, wherein the supervisory controller is configured to coordinate the wireless charging of the plurality of local controllers based, at least in part, on a position of the first wireless power receiving apparatus in relation to the plurality of primary coils.

29. The method of claim 24, further comprising predicting a motion of the first wireless power receiving apparatus in a first direction from the first primary coil to the second primary coil based on a change in the position of the first wireless power receiving apparatus in relation to the plurality of primary coils.

* * * * *